United States Patent
Tsai et al.

(10) Patent No.: US 10,571,625 B2
(45) Date of Patent: Feb. 25, 2020

(54) BACKLIGHT MODULE AND DISPLAY DEVICE USING SAME

(71) Applicant: HON HAI PRECISION INDUSTRY CO., LTD., New Taipei (TW)

(72) Inventors: Chia-Yi Tsai, New Taipei (TW); Yao-Pin Hsu, New Taipei (TW); Li-Chiao Huang, New Taipei (TW); Ming-Cheng Tai, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/276,912

(22) Filed: Feb. 15, 2019

(65) Prior Publication Data

US 2019/0324194 A1 Oct. 24, 2019

Related U.S. Application Data

(60) Provisional application No. 62/660,202, filed on Apr. 19, 2018.

(51) Int. Cl.
*F21V 8/00* (2006.01)
*G02F 1/1335* (2006.01)

(52) U.S. Cl.
CPC .......... *G02B 6/0088* (2013.01); *G02B 6/005* (2013.01); *G02B 6/0055* (2013.01); *G02B 6/0068* (2013.01); *G02F 1/133603* (2013.01); *G02F 1/133608* (2013.01); *G02F 2001/133614* (2013.01)

(58) Field of Classification Search
None
See application file for complete search history.

(56) References Cited

U.S. PATENT DOCUMENTS

| | | | |
|---|---|---|---|
| 7,819,539 B2 * | 10/2010 | Kim | H01L 33/507 313/110 |
| 8,449,129 B2 * | 5/2013 | Harbers | H05B 33/0803 362/84 |
| 9,519,161 B2 * | 12/2016 | Lee | G02F 1/0105 |
| 9,753,214 B2 * | 9/2017 | Shin | G02B 6/0073 |
| 9,939,678 B2 * | 4/2018 | Qiu | G02B 6/005 |
| 2010/0123851 A1 | 5/2010 | Mo et al. | |
| 2010/0187975 A1 * | 7/2010 | Tsukahara | G02B 6/0038 313/503 |
| 2015/0077970 A1 * | 3/2015 | Cha | F21K 9/90 362/84 |
| 2017/0269280 A1 * | 9/2017 | Kokudo | G02B 6/0026 |
| 2018/0231834 A1 * | 8/2018 | Chen | G02F 1/133528 |

FOREIGN PATENT DOCUMENTS

| | | |
|---|---|---|
| TW | M329794 | 4/2008 |
| TW | 201020633 A | 6/2010 |

\* cited by examiner

*Primary Examiner* — Elmito Breval
(74) *Attorney, Agent, or Firm* — ScienBiziP, P.C.

(57) ABSTRACT

A backlight module includes a substrate, a plurality of light sources on a surface of the substrate, a color conversion layer on a side of the plurality of light sources away from the substrate, and a frame between the substrate and the color conversion layer. Each light source is a light emitting diode chip configured for emitting light of a first color. The color conversion layer is configured for converting light to light of a second color. The frame surrounds the light sources. The frame includes dyes configured to absorb the light of the first color.

20 Claims, 4 Drawing Sheets

BACKLIGHT MODULE AND DISPLAY DEVICE USING SAME

FIELD

The subject matter herein generally relates to a backlight module and a display device using the backlight module.

BACKGROUND

A conventional display device generally includes a backlight module to provide backlight required for display. For example, the backlight module generally includes LEDs emitting blue light and a color converting layer to convert the blue light to light of other color, so white light can be obtained. However, a blue halo may exist at a peripheral portion of the backlight module because a portion of the blue light from edge of the backlight module cannot be successfully converted into white light, which obviously causes a problem of uneven display image of the display device.

Therefore, there is room for improvement in the art.

BRIEF DESCRIPTION OF THE DRAWINGS

Implementations of the present technology will now be described, by way of embodiments only, with reference to the attached figures.

DETAILED DESCRIPTION

Figure 1:
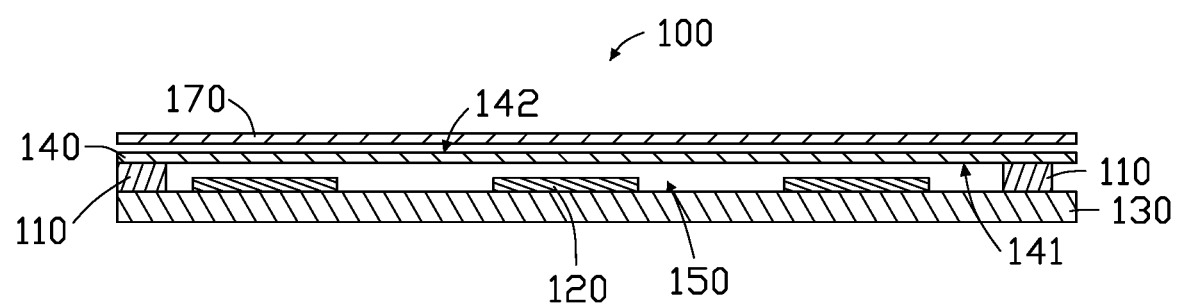
FIG. 1 is a cross-sectional view of a backlight module according to a first embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as coupled, whether directly or indirectly through intervening components, and is not necessarily limited to physical connections. The connection can be such that the objects are permanently coupled or releasably coupled. The term "comprising" when utilized, means "including, but not necessarily limited to"; it specifically indicates open-ended inclusion or membership in the so-described combination, group, series, and the like.

First Embodiment

FIG. 1 illustrates a backlight module 100 of a first embodiment. The backlight module 100 is a direct type backlight module and includes a frame 110, a plurality of light sources 120, a substrate 130, and a color conversion layer 140. FIG. 1 only shows one light source 120.

Each of the light sources 120 is a light emitting diode chip. The light sources 120 are located on a surface of the substrate 130 and spaced apart from each other. For example, the light sources 120 can be arranged in an array.

In one embodiment, the substrate 130 can be a glass substrate with a circuit (not shown) made of transparent conductive material on a surface of the glass substrate. In other embodiment, the substrate 130 can be a circuit board, such as a flexible circuit board. The light sources 120 receive electrical signals from the circuit or the flexible circuit board and emit light accordingly.

In the present embodiment, the substrate 130 has a rectangular shape and the frame 110 is coupled to a peripheral portion of the substrate 130. The frame 110 and the light sources 120 are located on a same side of the substrate 130. The substrate 130 and the frame 110 cooperate to form a receiving space 150. The light sources 120 are in the receiving space 150 and coupled to the substrate 130. The frame 110 surrounds the light sources 120. The frame 110 can be made of a plastic.

The color conversion layer 140 is coupled to a side of the frame 110 away from the substrate 130 and covers the receiving space 150. The frame 110 is between the substrate 130 and the color conversion layer 140, thus the color conversion layer 140 is spaced apart from the substrate 130. The color conversion layer 140 is also spaced apart from the light sources 120.

The color conversion layer 140 includes a light incident surface 141 and a light emitting surface 142. The light incident surface 141 is on a side of the color conversion layer 140 adjacent to the light sources 120, the light emitting surface 142 is opposite to the light incident surface 141 and is on a side of the color conversion layer 140 away from the light sources 120. The color conversion layer 140 includes a light color converting material, such as phosphor or quantum dots. When light emitted by the light sources 120 enters into the color conversion layer 140 from the light incident surface 141, then light of different color may be emitted from the light emitting surface 142 due to the light color converting material in the color conversion layer 140.

In one embodiment, the light sources 120 emit a first color light that is blue light. That is, the light source 120 is a blue light emitting diode chip. The color conversion layer 140 converts a portion of the first color light to a second color light. For example, the second color light is yellow light, and the color conversion layer 140 is a yellow conversion layer and includes yellow light converting material. The yellow light converting material can be yellow phosphor, a mixture of green quantum dots and red quantum dots, a mixture of green quantum dots and red phosphor, a mixture of green phosphor and red quantum dots, or a mixture of green phosphor and red phosphor. The yellow light converting material is excited to emit yellow light when it receives light from the light sources 120. The unconverted blue light and the yellow light are mixed together into white light.

In this embodiment, the frame 110 includes dyes of yellow color. When the first color light emitted by the light source 120 passes through the color conversion layer 140, a portion of the first color light is not converted into a second color light. The dyes in the frame 110 can absorb a portion of the unconverted light that is incident on the frame 110, thus a blue halo can be avoided, thereby ensuring uniformity of the light emitted from the backlight module 100.

As shown in FIG. 1, the backlight module 100 further includes an optical film 170 on a side of the color conversion layer 140 away from the light sources 120. In one embodiment, the optical film 170 can be a brightness enhancing film.

Second Embodiment

Figure 2:
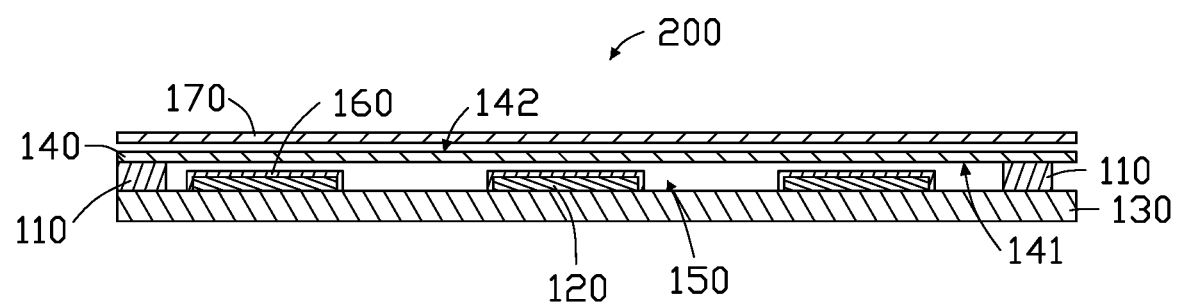
FIG. 2 is a cross-sectional view of a backlight module according to a second embodiment of the present disclosure.

FIG. 2 illustrates a backlight module 200 of a second embodiment. The backlight module 200 is substantially the same as the backlight module 100 and also includes a frame 110, a plurality of light sources 120, a substrate 130, a color conversion layer 140, and an optical film 170. The difference between the backlight module 200 and the backlight module 100 is that the backlight module 200 includes additional color conversion layers 160.

As shown in FIG. 2, each additional color conversion layer 160 corresponds to and covers one of the light sources 120. The additional color conversion layer 160 is formed on the substrate 130 and covers the light source 120. Light from the light source 120 is first converted by an additional color conversion layer 160, and then enters into the color conversion layer 140 and is converted by the color conversion layer 140. A portion of the unconverted light may be absorbed by the frame 110.

In one embodiment, the light sources 120 emit a first color light that is blue light. The additional color conversion layer 160 includes a red conversion material (such as a red phosphor, red quantum dot, or a mixture of red quantum dot and red phosphor). The color conversion layer 140 includes a green conversion material (such as a green phosphor, green quantum dot, or a mixture of green quantum dot and green phosphor). The additional color conversion layer 160 converts a portion of the blue light into red light, and then the mixed red light and unconverted blue light reaches the color conversion layer 140. The color conversion layer 140 converts a portion of the mixed light into green light. Finally, the unconverted blue light, the red light, and the green light are mixed together into white light. In this embodiment, the frame 110 includes dyes of green color. When the blue light and the red light pass through the color conversion layer 140, a portion of the blue light and of the red light is not converted into a green light. The dyes in the frame 110 absorb the unconverted light that is incident on the frame 110, thus a light halo can be avoided, thereby ensuring uniformity of the light emitted from the backlight module 200.

In one embodiment, the light sources 120 emit a first color light that is blue light. The additional color conversion layer 160 includes a green conversion material (such as a green phosphor, green quantum dot, or a mixture of green quantum dot and green phosphor). The color conversion layer 140 includes a red conversion material (such as a red phosphor, red quantum dot, or a mixture of red quantum dot and red phosphor). The additional color conversion layer 160 converts a portion of the blue light into green light, and then a mixed light of green light and unconverted blue light reaches the color conversion layer 140. The color conversion layer 140 converts a portion of the mixed light into red light. Finally, the unconverted blue light, the red light, and the green light are mixed together into white light. In this embodiment, the frame 110 includes dyes of red color. When the blue light and the green light passes through the color conversion layer 140, a portion of the blue light and the green light is not converted into a red light. The dyes in the frame 110 absorb the unconverted light that is incident on the frame 110.

In other embodiment, each of the light sources 120 may emit light of different colors, for example blue light and red light. Each of the light sources 120 may include a blue light emitting diode chip and a red light emitting diode chip. In this case, the additional color conversion layer 160 can be omitted.

Light from the light sources 120 that is not converted by the color conversion layer 140 tends to form a light halo in a peripheral portion of the backlight module. In this disclosure, the adding of dyes with a special color in the frame 110 to the backlight module effectively absorbs unconverted light that is incident on the frame 110. Thereby, a light halo can be effectively avoided, giving uniform light from the backlight module, and improving display quality.

Third Embodiment

Figure 3:
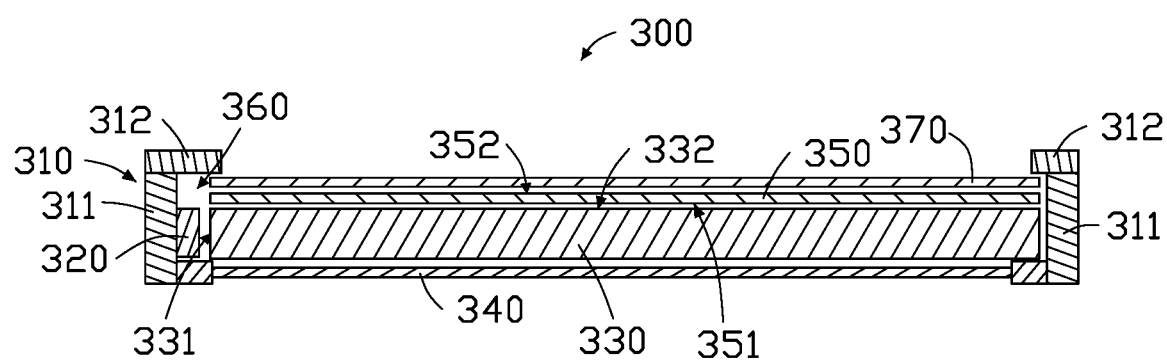
FIG. 3 is a cross-sectional view of a backlight module according to a third embodiment of the present disclosure.

FIG. 3 illustrates a backlight module 300 of a third embodiment. The backlight module 300 is a side type backlight module and includes a frame 310, a plurality of light sources 320, a light guiding plate 330, a reflective film 340, a color conversion layer 350, and an optical film 370. FIG. 3 only shows one light source 320.

As shown in FIG. 3, the light guiding plate 330 is located on a side of the reflective film 340. The color conversion layer 350 is located on a side of the light guiding plate 330 away from the reflective film 340. The optical film 370 is located on a side of the color conversion layer 350 away from the reflective film. The frame 310 surrounds the light guiding plate 330, the reflective film 340, the color conversion layer 350, and the optical film 370, all of which are stacked together.

The light guiding plate 330 includes a light incident surface 331 and a light emitting surface 332. The light emitting surface 332 is a surface of the light guiding plate 330 facing and adjacent to the color conversion layer 350. The light incident surface 331 is coupled to the light emitting surface 332. In this embodiment, the light incident surface 331 is perpendicular to the light emitting surface 332.

Each of the light sources 320 is a light emitting diode chip. The light sources 120 are located by a side of the light guiding plate 330 and face the light incident surface 331. For example, the light sources 320 can be arranged in a row. The light sources 320 are between the frame 310 and the light guiding plate 330. Light from the light sources 120 enters into the light guiding plate 330 from the light incident surface 331, and is emitted toward the color conversion layer 350 by the light emitting surface 332.

The color conversion layer 350 includes a light incident surface 351 and a light emitting surface 352. The light incident surface 351 is a surface of the color conversion layer 350 adjacent to the light guiding plate 330. The light emitting surface 352 is a surface of the color conversion layer 350 away from the light guiding plate 330. The color conversion layer 350 converts light into different colors and includes a light color converting material, such as phosphor or quantum dots.

The frame 310 includes a side portion 311 and an extending portion 312 coupled to the side portion 311. The side portion 311 surrounds the stacked light guiding plate 330, the reflective film 340, the color conversion layer 350, and the optical film 370. The extending portion 312 is coupled to an end of the side portion 311 and is adjacent to the optical film 370. The frame 310 can be made of a plastic.

The color conversion layer 350 receives light from the light emitting surface 332 of the light guiding plate 330 and converts a portion of the light into light of a different color (converted light).

The frame 310 includes dyes having a color that is same as color-converted light. Both the side portion 311 and an extending portion 312 include the dyes. When unconverted light is incident on the frame 310, the dyes absorb the unconverted light.

The reflective film 340 reflects light back into the light guiding plate 330. The optical film 370 can be a brightness enhancing film.

In one embodiment, each of the light sources 320 may emit blue light and green light. Each of the light sources 320 may include a blue light emitting diode chip and a green light emitting diode chip. The color conversion layer 350 is a red conversion layer and includes material to make light red. The red light converting material can be red phosphor, red quantum dots, or a mixture of red quantum dots and red phosphor. The red light converting material can be excited to emit red light when it receives light from the light sources 320. The unconverted blue light, the unconverted green light, and the red light are mixed into white light. The frame 310 includes red dyes to absorb the unconverted blue light and the unconverted green light.

In one embodiment, each of the light sources 320 may emit both blue light and red light. Each of the light sources 320 may include a blue light emitting diode chip and a red light emitting diode chip. The color conversion layer 350 is a green conversion layer and includes material to convert light into green light. The green light converting material can be green phosphor, green quantum dots, or a mixture of green quantum dots and green phosphor. The green light converting material can be excited to emit green light when it receives light from the light sources 320. The unconverted blue light, the unconverted red light, and the green light are mixed together into white light. The frame 310 includes green dyes to absorb a portion of the unconverted blue light and the unconverted red light.

In one embodiment, each of the light sources 320 may emit blue light. Each of the light sources 320 may include a blue light emitting diode chip. The color conversion layer 350 is a yellow conversion layer and includes material to convert light into yellow light. The yellow light converting material can be yellow phosphor, a mixture of green quantum dots and red quantum dots, a mixture of green quantum dots and red phosphor, a mixture of green phosphor and red quantum dots, or a mixture of green phosphor and red phosphor. The yellow light converting material can be excited to emit yellow light when it receives light from the light sources 320. The unconverted blue light and the yellow light are mixed into white light. The frame 310 includes yellow dyes to absorb a portion of the unconverted blue light.

Light from the light sources 320 that is not converted by the color conversion layer 350 would otherwise form a light halo in a peripheral portion of the backlight module 300. In this disclosure, the addition of dyes of certain color to the backlight module enables the frame 310 to effectively absorb the unconverted light that is incident on the frame 310. Thus, the light halo can be effectively avoided, thereby facilitating uniformity of light from the backlight module, and improving display quality.

Figure 4:
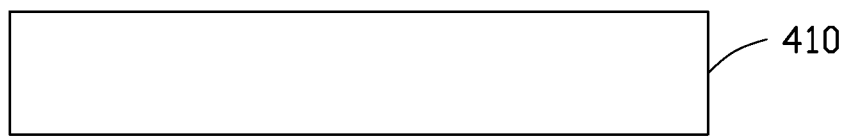
FIG. 4 is a cross-sectional view of a display device comprising the backlight module of FIG. 1, FIG. 2, or, FIG. 3.
Figure 4:

FIG. 4 illustrates a display device 400. The display device 400 includes a backlight module 100 and a liquid crystal display panel 410 stacked on the backlight module 100. The display device 400 can function with the backlight module 100, the backlight module 200, or the backlight module 300.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A backlight module, comprising:
   a substrate;
   a plurality of light sources on a surface of the substrate, each of the plurality of light sources being a light emitting diode chip configured for emitting light of a first color;
   a color conversion layer on a side of the plurality of light sources away from the substrate, the color conversion layer being configured for converting light of the first color to light of a second color; and
   a frame between the substrate and the color conversion layer, the frame surrounding the plurality of light sources;
   wherein the frame comprises dyes configured to absorb the light of the first color.

2. The backlight module of claim 1, wherein the substrate is a circuit board.

3. The backlight module of claim 1, wherein the light of the first color is blue light; the light of a second color is yellow light; the frame comprises dyes of yellow color.

4. The backlight module of claim 1, further comprising a plurality of additional color conversion layers; wherein each of the plurality of additional color conversion layers corresponds to and covers one of the plurality of light sources.

5. The backlight module of claim 4, wherein light of the first color is blue light; each of the plurality of additional color conversion layers is a red conversion layer, light of the second color is green light; the frame comprises dyes of green color.

6. The backlight module of claim 4, wherein light of the first color is blue light; each of the plurality of additional color conversion layers is a green conversion layer, the light of the second color is red light; the frame comprises dyes of red color.

7. A backlight module, comprising:
   a reflective film;
   a light guiding plate stacked on a side of the reflective film;
   a color conversion layer stacked on a side of the light guiding plate away from the reflective film, the color conversion layer being configured for converting color of light;
   a frame surrounding the reflective film, the light guiding plate, and the color conversion layer; and
   a plurality of light sources between the frame and the light guiding plate, each of the plurality of light sources is a light emitting diode chip being configured for emitting light;
   wherein the frame comprises dyes configured to absorb the light from the plurality of light sources.

8. The backlight module of claim 7, wherein each of the plurality of light sources emits blue light; the color conversion layer is a yellow conversion layer; the frame comprises dyes of yellow color.

9. The backlight module of claim 7, wherein each of the plurality of light sources emits blue light and green light; the color conversion layer is a red conversion layer; the frame comprises dyes of red color.

10. The backlight module of claim 7, wherein each of the plurality of light sources emits blue light and red light; the color conversion layer is a green conversion layer; the frame comprises dyes of green color.

11. The display device of claim 10, wherein the backlight module further comprises a reflective film and a light guiding plate stacked on a side of the reflective film; the color conversion layer is stacked on a side of the light guiding plate away from the reflective film; the frame surrounds the reflective film, the light guiding plate, and the color conversion layer; and the plurality of light sources is between the frame and the light guiding plate.

12. The display device of claim 11, wherein each of the plurality of light sources emits blue light; the color conversion layer is a yellow conversion layer; the frame comprises dyes of yellow color.

13. The display device of claim 11, wherein each of the plurality of light sources emits blue light and green light; the color conversion layer is a red conversion layer; the frame comprises dyes of red color.

14. The display device of claim 11, wherein each of the plurality of light sources emits blue light and red light; the color conversion layer is a green conversion layer; the frame comprises dyes of green color.

15. A display device, comprising:
a backlight module; and
a display panel stacked on the backlight module;
the backlight module, comprising:
a plurality of light sources, each of the plurality of light sources being a light emitting diode chip configured for emitting light;
a color conversion layer configured for receiving and converting color of light from the plurality of light sources; and
a frame by a side of the plurality of light sources;
wherein the frame comprises dyes configured to absorb a portion of the light from the plurality of light sources.

16. The display device of claim 10, wherein the backlight module further comprises a substrate; the plurality of light sources are on a surface of the substrate; the color conversion layer is on a side of the plurality of light sources away from the substrate, the color conversion layer is configured for converting light to light of a second color; and the frame is between the substrate and the color conversion layer, the frame surrounds the plurality of light sources; the substrate is a circuit board.

17. The display device of claim 16, wherein each of the plurality of light sources emits blue light; the light of a second color is yellow light; the frame comprises dyes of yellow color.

18. The display device of claim 16, wherein the backlight module further comprises a plurality of additional color conversion layers; wherein each of the plurality of additional color conversion layers corresponds to and covers one of the plurality of light sources.

19. The display device of claim 18, wherein each of the plurality of light sources emits blue light; each of the plurality of additional color conversion layers is a red conversion layer, light of the second color is green light; the frame comprises dyes of green color.

20. The display device of claim 18, wherein each of the plurality of light sources emits blue light; each of the plurality of additional color conversion layers is a green conversion layer, light of the second color is red light; the frame comprises dyes of red color.

* * * * *